(12) United States Patent
Goldfine et al.

(10) Patent No.: US 12,253,492 B2
(45) Date of Patent: Mar. 18, 2025

(54) IN-PROCESS QUALITY ASSESSMENT FOR ADDITIVE MANUFACTURING

(71) Applicant: JENTEK Sensors, Inc., Marlborough, MA (US)

(72) Inventors: Neil J Goldfine, Cocoa Beach, FL (US); Todd M Dunford, Amherst, MA (US)

(73) Assignee: JENTEK Sensors, Inc., Marlborough, MA (US)

( * ) Notice: Subject to any disclaimer, the term of this patent is extended or adjusted under 35 U.S.C. 154(b) by 0 days.

(21) Appl. No.: 18/459,641

(22) Filed: Sep. 1, 2023

(65) Prior Publication Data

US 2023/0408449 A1   Dec. 21, 2023

Related U.S. Application Data

(63) Continuation of application No. 18/092,422, filed on Jan. 2, 2023, now Pat. No. 11,747,304, which is a
(Continued)

(51) Int. Cl.
| | |
|---|---|
| *G01N 27/9013* | (2021.01) |
| *B22F 10/20* | (2021.01) |
| *B22F 10/28* | (2021.01) |
| *B22F 10/38* | (2021.01) |
| *B22F 10/85* | (2021.01) |
| *B22F 12/49* | (2021.01) |
| *B22F 12/90* | (2021.01) |
| *B33Y 10/00* | (2015.01) |

(Continued)

(52) U.S. Cl.
CPC ........... *G01N 27/902* (2013.01); *B22F 10/20* (2021.01); *B22F 10/28* (2021.01); *B22F 10/38* (2021.01); *B22F 10/85* (2021.01); *B22F 12/49* (2021.01); *B22F 12/90* (2021.01); *B33Y 10/00* (2014.12); *B33Y 30/00* (2014.12); *B33Y 50/02* (2014.12); *G01N 27/9046* (2013.01); *B22F 10/30* (2021.01); *Y02P 10/25* (2015.11)

(58) Field of Classification Search
None
See application file for complete search history.

(56) References Cited

U.S. PATENT DOCUMENTS

2014/0182389  A1*  7/2014  Dunford  ............. G01M 5/0033
                                                        73/779

* cited by examiner

*Primary Examiner* — Anthony M Liang
(74) *Attorney, Agent, or Firm* — Zachary M. Thomas

(57) ABSTRACT

Disclose is a system and method for real-time measurement and feedback of metrology and metallurgical data during additive manufacturing (AM) part fabrication. This solution promises to provide higher performance, lower cost AM parts. A sensor is placed either in the rake/roller or following the rake/roller so that it has no impact on the process efficiency and can be used to provide real-time feedback and an archived digital map of the entire part volume. The solution provides non-contact sensing of AM layer's electrical conductivity in a high-temperature environment, metallurgical property verification, porosity imaging, local defect detection and sizing, local material temperature monitoring, and grain anisotropy imaging. Part geometry, the AM powder, and the laser/material interface are monitored in real-time. Dual mode sensing using magnetoquasistatic and optical sensors enhance results. Real-time nonlinear control of the AM fabrication process is performed based on the sensor data.

11 Claims, 4 Drawing Sheets

Related U.S. Application Data continuation of application No. 17/653,024, filed on Mar. 1, 2022, now Pat. No. 11,543,388, which is a continuation of application No. 15/796,351, filed on Oct. 27, 2017, now Pat. No. 11,268,933.

(60) Provisional application No. 62/471,447, filed on Mar. 15, 2017, provisional application No. 62/413,862, filed on Oct. 27, 2016.

(51) Int. Cl.
  *B33Y 30/00* (2015.01)
  *B33Y 50/02* (2015.01)
  *G01N 27/00* (2006.01)
  *G01N 27/90* (2021.01)
  *B22F 10/30* (2021.01)

IN-PROCESS QUALITY ASSESSMENT FOR ADDITIVE MANUFACTURING

The present application is a continuation of U.S. patent application Ser. No. 18/092,422 filed Jan. 2, 2023, which itself is a continuation of U.S. patent application Ser. No. 17/653,024 filed Mar. 1, 2023, now U.S. Pat. No. 11,543,388 issued Jan. 3, 2023, which itself is a continuation of U.S. patent application Ser. No. 15/796,351 field Oct. 27, 2017, now U.S. Pat. No. 11,268,933 issued Mar. 8, 2022, which itself claims the benefit of U.S. provisional patent application, U.S. Ser. No. 62/413,862, filed Oct. 27, 2016, and U.S. provisional patent application, U.S. Ser. No. 62/471,447, filed Mar. 15, 2017, all of which are herein incorporated by reference in their entirety.

BACKGROUND

1. Technical Field

The present invention relates to real-time control of additive manufacturing processes.

2. Description of Related Art

Additive Manufacturing (AM) is a process for fabricating objects by sequentially adding material in a series of controlled steps. Examples of AM processes include 3D printing, cold spray, and thermal spray. AM processes also include powder based (laser sintering) methods that use a powder bed and welding based methods that add material using robot mounted welding tools or other means for moving the welding tool relative to a part surface to add material to a surface.

SUMMARY

Some embodiments are directed to a method for imaging the properties of an additive manufacturing deposited layer, where an eddy current sensor array is moved across the most recently applied layer to measure lift-off (proximity to the layer) and at least one other property of the material to determine the condition of the most recently applied layer.

In some embodiments the eddy current sensor has a linear drive and multiple sensing elements, each at a fixed distance from the linear drive.

In some embodiments a model is used to generate a set of precomputed responses before the movement of the sensor array across the surface of the material under test and an algorithm is used to determine the liftoff and at least one other property of the material under test from the sensor response.

In some embodiments a third property is also determined.

In some embodiments the third property is a property of the bonded interface used to ensure that the bond is of acceptable quality.

In some embodiments the sensor response is provided to a process control function that is then used to adjust the process to improve the fabrication results.

In some embodiments where the second property is the conductivity of the most recently deposited layer.

In some embodiments where the inspection is performed in a non-contact manner.

In some embodiments where the inspection is contacting and the lift-off is used to measure the surface roughness.

In some embodiments the sensor also measures the properties of a powder used as part of the process.

In some embodiments the sensor follows a spreading apparatus used to spread powder across the fabrication area, In some embodiments the spreading apparatus is a rake.

In some embodiments the spreading apparatus is a roller.

In some embodiments the second property is a magnetic permeability of a relatively low electrical conductivity material.

In some embodiments the layer is a low observable layer.

Another aspect relates to an apparatus for imaging the properties of an additive manufacturing deposited layer, comprising an eddy current sensor array that is moved across the most recently applied layer, means to convert the sensor repose into a measurement of lift-off (proximity to the layer) and at least one other property of the material to determine the condition of the most recently applied layer.

In some embodiments the eddy current sensor has a linear drive and multiple sensing elements, each at a fixed distance from the linear drive.

Some embodiments further comprise a model is used to generate a set of precomputed responses before the movement of the sensor array across the surface of the material under test and an algorithm is used to determine the liftoff and at least one other property of the material under test from the sensor response.

In some embodiments a third property is also determined.

In some embodiments the third property is a property of the bonded interface used to ensure that the bond is of acceptable quality.

Some embodiments further comprise a means to provide the sensor response to a process control function to adjust the process to improve the fabrication results.

In some embodiments the second property is the conductivity of the most recently deposited layer.

In some embodiments the inspection is performed in a non-contact manner.

In some embodiments the inspection is contacting and the lift-off is used to measure the surface roughness.

In some embodiments the sensor also measures the properties of a powder used as part of the process.

In some embodiments the sensor follows a spreading apparatus used to spread powder across the fabrication area. In some embodiments the spreading apparatus is a rake. In some embodiments the spreading apparatus is a roller.

In some embodiments the second property is a magnetic permeability of a relatively low electrical conductivity material. In some embodiments the layer is a low observable layer.

Another aspect relates to an apparatus comprising a linear drive eddy current sensor with a linear array of sensing elements and means for translating the sensor across a material under test between the successive deposition of new layers in an additive manufacturing process In some embodiments the sensor is used to measure the properties of the material under test In some embodiments the sensor measures lift-off and one other property of the material under test.

In some embodiments the sensor measures the geometry of the part using the sensor response to determine the location of the edges of the part In some embodiments the sensor also measures the properties of the powder.

In some embodiments the sensor follows the apparatus used to spread powder across the fabrication area. In some embodiments the spreading apparatus is a rake. In some embodiments the spreading apparatus is a roller.

In some embodiments a model is used to convert multiple frequency data into more than one property estimate for the material under test.

In some embodiments the sensor is fabricated from high temperature alloy conductors on an insulating substrate. In some embodiments the alloy is a nickel alloy and the substrate is ceramic and the leads are also nickel until they are away from the high temperature area.

In some embodiments the sensor measures a property of the material that is correlated with temperature of the material and the estimated material property is then converted to a temperature estimate. In some embodiments the temperature estimated is the temperature at the surface of the last deposited layer. In some embodiments the temperature estimated is the temperature of the powder.

Yet another aspect relates to an apparatus for imaging the properties of an additive manufacturing deposited layer, where a sensor array is moved across the most recently applied layer to measure lift-off (proximity to the layer) and at least one other property of the material to determine the condition of the most recently applied layer.

In some embodiments the sensor array applies a predominantly electric field for interrogating the test material. In some embodiments the one other property is the dielectric permittivity.

Another aspect relates to a system configured for in process monitoring of a melt pool or weld site.

In some embodiments the process monitoring is in process layer by layer nondestructive testing (NDT) following the rake or integrated with the rake or other means for scanning the surface noncontact between layer deposition steps.

Some embodiments comprise a processor to perform post process NDT before and after post processing using hipping or other means to change porosity. Using this to qualify the parts.

In some embodiments the system is configured to perform post process NDT using knowledge that the process was performed using AM, such as layering to identify representative defect types. Using this to select the frequency, drive orientation, and/or to provide feedback to the processing to improve quality.

In some embodiments the system is configured to perform post process NDT to identify linear defects, local defects and gradual material variations and attributing these to AM processing issues and iteratively improving the process to eliminate these defects.

In some embodiments the system is configured to perform post process NDT for part qualification using segmented field MWM®-Array eddy current sensors or just MWM-Array eddy current sensors and possibly adding knowledge of specific AM defect types is unique.

Another aspect relates to an apparatus for monitoring the additive manufacturing process, the apparatus comprising (i) a sensor array having a linear drive element and a linear array of sensing elements; and (ii) an instrument to provide process monitoring of the additive manufacturing process in a noncontact mode with the sensor.

In some embodiments the sensor array has an open space between the drive winding and the linear array of sense elements (so that the processing laser can access the surface of the part and perform the AM process).

In some embodiments the sensing elements are inductive elements with a rectangular form with the response measured at each rectangular shaped sense element at at least one prescribed frequency and the drive is driven with a current at this same frequency to determine the impedance response for each sense element.

In some embodiments the response is measured at at least two simultaneous frequencies at the same time, in parallel, for each sensing element in the array.

In some embodiments there are at least two rows of sensing elements at distinct distances from the drive to vary the depth of penetration of an applied field at the same applied frequency. In some embodiments where the field is an electric field. In some embodiments the material being inspected is relatively low conductivity of less than 0.01 S/m and the sensing elements are electrodes and the drive is also an electrode forming a dielectrometer.

In some embodiments the field is a magnetic field.

In some embodiments a combination of multiple frequencies and segmented field (multiple rows of sensing elements) is used to characterize layer properties and detect defective layers.

In some embodiments two NDT methods are used in process. In some embodiments the first process uses a linear drive and row of sensing elements and the second process uses an optical method.

Another aspect relates to an apparatus for monitoring a laser sintering process, the apparatus includes (i) a drive element; and (ii) at least one sense elements, wherein the drive element follows the process in a noncontact mode and the sense leads the process (or vice versa) and the field projected by the drive and sensed by the sense is influenced by the material in the processed zone, where the sensor response is used to measure the process performance.

In some embodiments the drive and sense element array of at least 2 sensing elements forms an eddy current array and eddy currents are induced at the site of the sintering.

In some embodiments the sensing response provides feedback to a process control routine.

In some embodiments in addition to monitor the process the sensor response is used to measure the quality of the processed material, both during the processing and/or between processing steps.

Another aspect relates to an apparatus for monitoring an E-beam welding process, the apparatus includes a drive element and at least one sense elements, wherein the drive follows the process in a noncontact mode and the sense leads the process (or vice versa) and the field projected by the drive and sensed by the sense is influenced by the material in the processed zone, where the sensor response is used to measure the process performance.

In some embodiments the drive and sense element array of at least 2 sensing elements forms an eddy current array and eddy currents are induced at the site of the melt pool and the neighboring material.

In some embodiments the sensing response provides feedback to a process control routine.

In some embodiments in addition to monitor the process the sensor response is used to measure the quality of the processed material, both during the processing and/or between processing steps.

Another aspect relates to an apparatus for in-process monitoring of an additive manufactured part, the apparatus comprises a sensor with a linear drive conductor.

In some embodiments a linear array of sensing elements is used and the drive current and sensed responses are used to determine the complex impedance at each sensing element in parallel using an impedance instrument.

In some embodiments the apparatus uses the properties measured for at least one previously processed layer to improve the property measurement for the most recently deposited layer.

In some embodiments the apparatus uses at least two applied frequencies and one linear array of sensing elements at a prescribed distance from the drive that is selected to enable noncontact imaging and also provide sufficient penetration depth to penetrate through the most recently processed layer but not more than three times the layer thickness into the substrate, so that the nearest layer properties dominate the response.

In some embodiments the apparatus includes a linear drive and two rows of sensing elements at distinct distances from the drive to enable penetration at two different depth into the processed material at the same excitation frequency.

In some embodiments at least two frequencies are used to estimate at least three properties of the most recently deposited layer and the previously deposited layer.

In some embodiments the properties measured are the liftoff, the conductivity and thickness of the top layer and the conductivity of the previously deposited layer.

In some embodiments the process is powder bed fusion using sintering. In some embodiments the process is powder bed fusion using E-Beam welding. In some embodiments the process is E-Beam welding with a robot.

Another aspect relates to an apparatus for nondestructive testing of an additive manufactured part, the apparatus includes an eddy current sensor array and a model that enables correction of data for variable liftoff and provides a measure of density by correlating electrical conductivity measurements with porosity a part using a set of standards to build the correlation for essentially the same process setup.

In some embodiments local high porosity regions are detected.

In some embodiments linear porosity defects are detected.

In some embodiments gradual variations in porosity are mapped with a C-scan imaging software tool.

In some embodiments the results of the NDT are used to improve the process to reduce the occurrence of the detected defects.

In some embodiments a precomputed database is used to provide the multiple unknown property estimation.

In some embodiments scans with two drive conductor orientations are made and combined to enable detection of more defect types more reliably.

Another aspect relates to an apparatus with an eddy current sensor array including a linear drive and at least two sensing elements at a prescribed distance from the drive for non-contact imaging of a material during additive manufacturing where the array response is used to characterize both the processed material in solid form and the powder material using at least two frequencies where one frequency is sufficiently high to induce eddy currents in the powder and the other frequency is less than 5 MHz.

In some embodiments the powder is non-magnetic and the measurement is sensitive to the conductivity and size of powder and conductivity variation in the solid.

In some embodiments the powder is magnetic and a low frequency below 10 KHz is used to measure a magnetic property and a high frequency above 100 KHz is used to determine the electrical conductivity and the two frequencies together are used to estimate particle size.

In some embodiments at least two frequencies are used to estimate particle size variations. In some embodiments at least two frequencies are used to detect clumping or other anomalies in the powder. In some embodiments the array response is used to determine the temperature of the powder. In some embodiments the array response is used to determine the temperature of the solid.

The foregoing is a non-limiting summary of the invention, which is defined by the attached claims.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1:
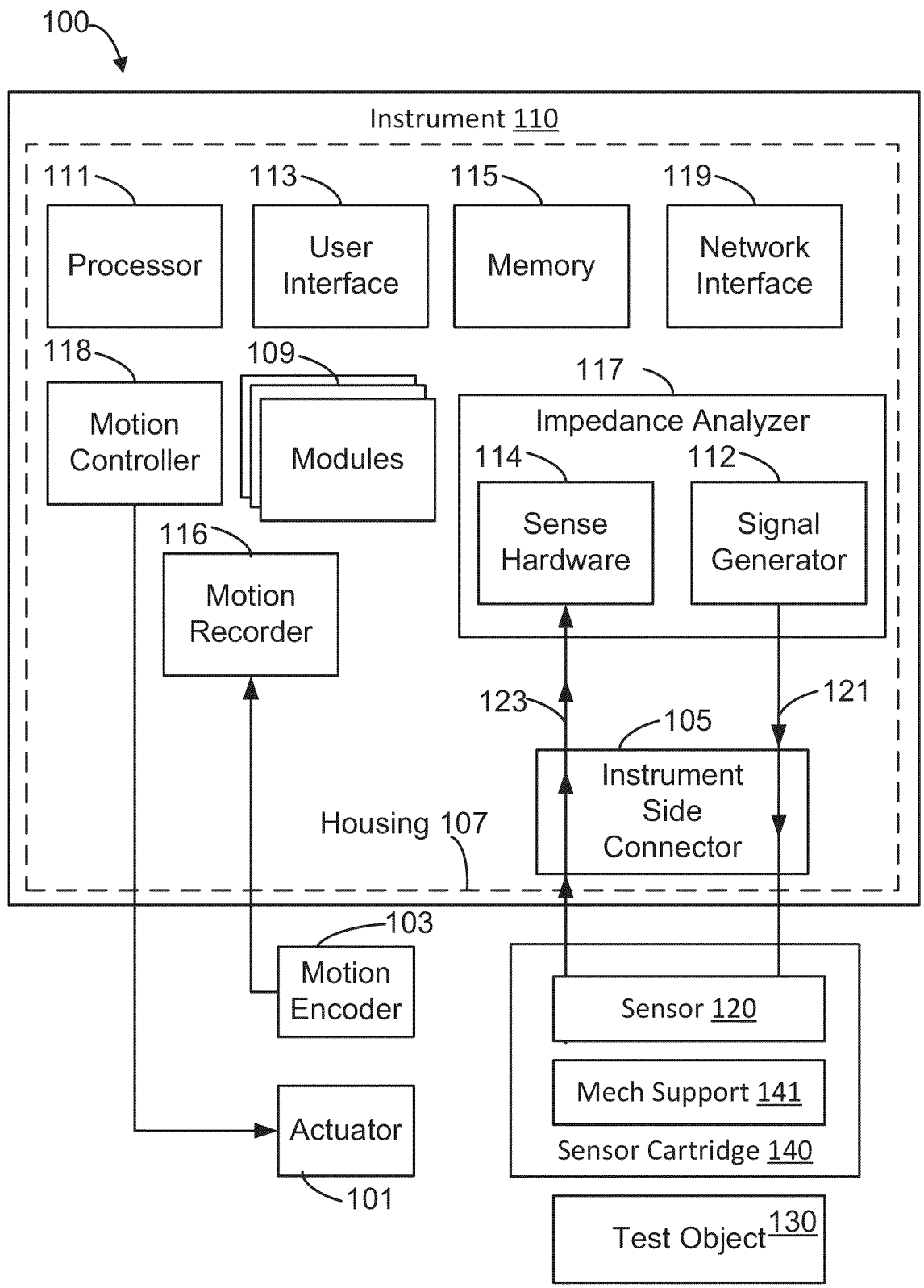
FIG. 1 is a block diagram of a system for inspecting a test object according to some embodiments.

FIG. 1 is a block diagram of a system 100 for inspecting a test object 130. System 100 includes an instrument 110 and a sensor cartridge 140. Instrument 110 may be housed in a housing 107; in some embodiments the housing is substantially cylindrical in shape. Sensor cartridge 140 has a rigid connector which interfaces both mechanically and electrically with an instrument side connector 105. Advantageously in some embodiments both the electrical and mechanical connections of sensor cartridge 140 engage simultaneously with connector 105. Sensor cartridge 140 also includes a flexible sensor 120, and a mechanical support 141 to which the sensor is attached. Instrument 110 is configured to provide excitation signals 121 to sensor 120 and measure the resulting response signals 123 of sensor 120. Response signals 123 may be measured and processed to estimate properties of interest, such as electromagnetic properties (e.g., conductivity, permeability, and permittivity), geometric properties (e.g., thickness, sensor lift-off), material condition (e.g., fault/no fault, crack size, corrosion depth, stress level, temperature), or any other suitable property or combination thereof. (Sensor lift-off is a distance between the sensor and the closest surface of the test object for which the sensor is sensitive to the test object's electrical properties.)

Instrument 110 may include a processor 111, a user interface 113, memory 115, an impedance analyzer 117, and a network interface 119. Though, in some embodiments of instrument 110 may include other combinations of components. While instrument 110 is drawn with housing 107, it should be appreciated that instrument 110 may be physically realized as a single mechanical enclosure; multiple, operably-connected mechanical enclosures, or in any other suitable way. For example, in some embodiments it may be desired to provide certain components of instrument 110 as proximal to sensor 120 as practical, while other components of instrument 110 may be located at greater distance from sensor 120.

Processor 111 may be configured to control instrument 110 and may be operatively connected to memory 115.

Processor 111 may be any suitable processing device such as for example and not limitation, a central processing unit (CPU), digital signal processor (DSP), controller, addressable controller, general or special purpose microprocessor, microcontroller, addressable microprocessor, programmable processor, programmable controller, dedicated processor, dedicated controller, or any suitable processing device. In some embodiments, processor 111 comprises one or more processors, for example, processor 111 may have multiple cores and/or be comprised of multiple microchips.

Memory 115 may be integrated into processor 111 and/or may include "off-chip" memory that may be accessible to processor 111, for example, via a memory bus (not shown). Memory 115 may store software modules that when executed by processor 111 perform desired functions. Memory 115 may be any suitable type of non-transient computer-readable storage medium such as, for example and not limitation, RAM, a nanotechnology-based memory, one or more floppy disks, compact disks, optical disks, volatile and non-volatile memory devices, magnetic tapes, flash memories, hard disk drive, circuit configurations in Field Programmable Gate Arrays (FPGA), or other semiconductor devices, or other tangible, non-transient computer storage medium.

Instrument 110 may have one or more functional modules 109. Modules 109 may operate to perform specific functions such as processing and analyzing data. Modules 109 may be implemented in hardware, software, or any suitable combination thereof. Memory 115 of instrument 110 may store computer-executable software modules that contain computer-executable instructions. For example, one or more of modules 109 may be stored as computer-executable code in memory 115. These modules may be read for execution by processor 111. Though, this is just an illustrative embodiment and other storage locations and execution means are possible.

Instrument 110 provides excitation signals for sensor 120 and measures the response signal from sensor 120 using impedance analyzer 117. Impedance analyzer 117 may contain a signal generator 112 for providing the excitation signal to sensor 120. Signal generator 112 may provide a suitable voltage and/or current waveform for driving sensor 120. For example, signal generator 112 may provide a sinusoidal signal at one or more selected frequencies, a pulse, a ramp, or any other suitable waveform.

Sense hardware 114 may comprise multiple sensing channels for processing multiple sensing element responses in parallel. Though, other configurations may be used. For example, sense hardware 114 may comprise multiplexing hardware to facilitate serial processing of the response of multiple sensing elements. Sense hardware 114 may measure sensor transimpedance for one or more excitation signals at on one or more sense elements of sensor 120. It should be appreciated that while transimpedance (sometimes referred to simply as impedance), may be referred to as the sensor response, the way the sensor response is represented is not critical and any suitable representation may be used. In some embodiments, the output of sense hardware 114 is stored along with temporal information (e.g., a time stamp) to allow for later temporal correlation of the data.

Sensor 120 may be an eddy-current sensor, a dielectrometry sensor, an ultrasonic sensor, or utilize any other suitable sensing technology or combination of sensing technologies. In some embodiments sensor 120 provides temperature measurement, voltage amplitude measurement, stain sensing or other suitable sensing modalities or combination of sensing modalities. In some embodiments, sensor 120 is an eddy-current sensor such as an MWM®, MWM-Rosette, or MWM-Array sensor available from JENTEK Sensors, Inc., Waltham, MA. Sensor 120 may be a magnetic field sensor or sensor array such as a magnetoresistive sensor (e.g., MR-MWM-Array sensor available from JENTEK Sensors, Inc.), a segmented field MWM sensor, hall effect sensors, and the like. In another embodiment, sensor 120 is an interdigitated dielectrometry sensor or a segmented field dielectrometry sensor such as the IDED® sensors also available from JENTEK Sensors, Inc. Segmented field sensors have sensing elements at different distances from the drive winding or electrode to enable interrogation of a material to different depths at the same drive input frequency. Sensor 120 may have a single or multiple sensing and drive elements. Sensor 120 may be scanned across, mounted on, or embedded into test object 130.

In some embodiments, the computer-executable software modules may include a sensor data processing module, that when executed, estimates properties of test object 130. The sensor data processing module may utilize multi-dimensional precomputed databases that relate one or more frequency transimpedance measurements to properties of test object 130 to be estimated. The sensor data processing module may take the precomputed database and sensor data and, using a multivariate inverse method (MIM), estimate material properties. Though, the material properties may be estimated using any other analytical model, empirical model, database, look-up table, or other suitable technique or combination of techniques.

User interface 113 may include devices for interacting with a user. These devices may include, by way of example and not limitation, keypad, pointing device, camera, display, touch screen, audio input and audio output.

Network interface 119 may be any suitable combination of hardware and software configured to communicate over a network. For example, network interface 119 may be implemented as a network interface driver and a network interface card (NIC). The network interface driver may be configured to receive instructions from other components of instrument 110 to perform operations with the NIC. The NIC provides a wired and/or wireless connection to the network. The NIC is configured to generate and receive signals for communication over network. In some embodiments, instrument 110 is distributed among a plurality of networked computing devices. Each computing device may have a network interface for communicating with other the other computing devices forming instrument 110.

In some embodiments, multiple instruments 110 are used together as part of system 100. Such systems may communicate via their respective network interfaces. In some embodiments, some components are shared among the instruments. For example, a single computer may be used control all instruments. In one such embodiment multiple features, such as bolt holes or disk slots, are inspected simultaneously or in an otherwise coordinated fashion to using multiple instruments and multiple sensor arrays with multiple integrated connectors to inspect a component faster or more conveniently.

Actuator 101 may be used to position sensor cartridge 140 with respect to test object 130 and ensure suitable conformance of sensor 120 with test object 130. Actuator 101 may be an electric motor, pneumatic cylinder, hydraulic cylinder, or any other suitable type or combination of types of actuators for facilitating movement of sensor cartridge 140 with respect to test object 130. Sensor cartridge 140 may be positioned manually in some embodiments, while still other embodiments a combination of actuators and manual positioning may be used. For scanning applications where sensor 120 moves relative to test object 130, it is not critical whether sensor 120 or test object 130 is moved, or if both are moved to achieve the desired scan. Scanning may be performed in a contact or noncontact manner. For contact sensors, one embodiment includes a plastic shuttle or metal shuttle that is shaped similarly to the surface being inspected, with a flexible layer such as foam which is attached to the shuttle with an adhesive or other means, and with the sensor mounted to the foam. In some applications the foam or flexible layer is not included and the sensor is mounted directly to the plastic or other material shuttle.

Actuators 141 may be controlled by motion controller 118. Motion controller 118 may control sensor cartridge 140 to move sensor 120 relative to test object 130 during an inspection procedure. In one embodiment, a flexible lead is used to coil on a shaft to enable rotation of a sensor within a hole. In one such embodiment a gain stage of the electronics are located on a rotating mechanism that rotates with the sensor to improve performance. In another embodiment the entire instrument is rotated with sensor cartridge 140.

Regardless of whether motion is controlled by motion controller 118 or directly by the operator, position encoders 143 of fixture 140 and motion recorder 116 may be used to record the relative positions of sensor 120 and test object 130. This position information may be recorded with impedance measurements obtained by impedance instrument 117 so that the impedance data may be spatially registered.

Some further embodiments of system 100 are disclosed in U.S. patent application Ser. No. 15/030,094 filed Apr. 18, 2016 (U.S. published application No. 2016/0274060) which is hereby incorporated by reference in its entirety.

Figure 2:
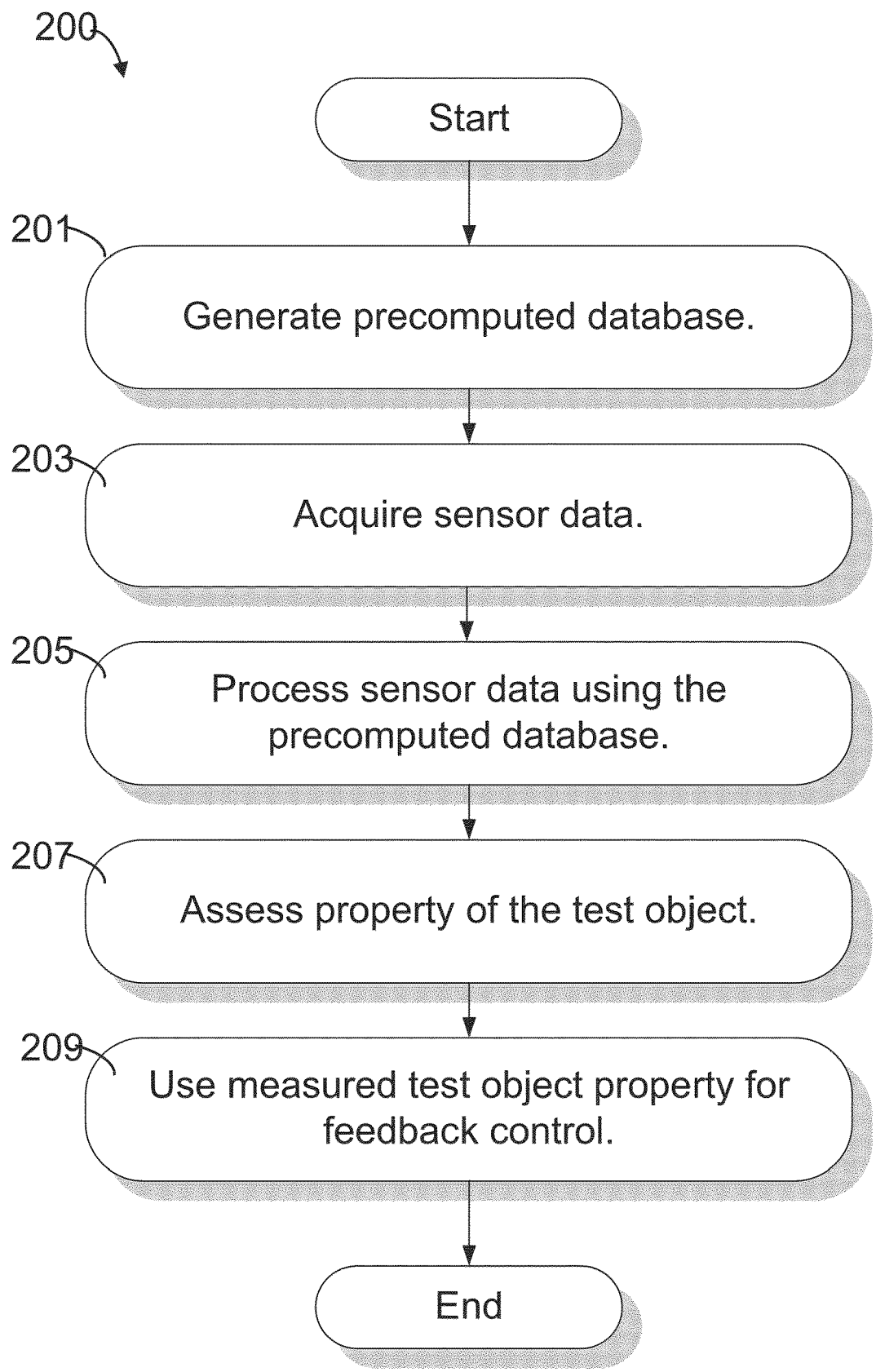
FIG. 2 is a flow diagram of a method of assessing a property of a test object according to some embodiments.

System 100 may be used to perform a method 200 for assessing a property of a test object, shown in FIG. 2.

At step 201 a precomputed database of sensor response signals is generated. The response signals generated may be predictions of the response signal 123 in FIG. 1 for a given excitation signal 121, sensor 120 and test object 103. Response signals may be generated for a variety of excitation signals, sensors/sense elements, and test objects, including variation in the position and orientation of the sensor and test objet. For example, the precomputed database may be generated for multiple excitation frequencies, multiple sensor geometries, multiple lift-offs, and multiple test object properties (e.g., geometric variations, electromagnetic property variations). The precomputed database may be generated using a model of the system, empirical data, or in any suitable way. In some embodiments the model is an analytical model, a semi-analytical model, or a numeric (e.g., finite element) model.

At step 203, sensor data is acquired. The sensor data may be acquired, for example, using instrument 110. Sensor data may be a recorded representation of the response signal 123, excitation signal 121, or some combination of the two (e.g., impedance). In some embodiments, sensor data is acquired at a plurality of excitation frequencies, multiple sensors (or sensing elements), and/or multiple sensor/test object positions/orientations (e.g., as would be the case during scanning).

At step 205, the sensor data is processed using the precomputed database generated at step 201. A multivariate inverse method may be used to process the sensor data with the At step 207, a property of the test object is assessed based on the processing of the measurement data at step 205. The property assessed may be an electromagnetic property, geometric property, state, conditions, or any other suitable type of property. Specific properties include, for example and not limitation, electrical conductivity, magnetic permeability, electrical permittivity, layer thickness, stress, temperature, damage, age, health, density, viscosity, cure state, embrittlement, wetness, and contamination. Step 207 may include a decision making where the estimated data is used to choose between a set of discrete outcomes. Examples include pass/fail decisions on the quality of a component, or the presence of flaws. Another example it may be determined whether the test object may be returned to service, repaired, replaced, scheduled for more or less frequent inspection, and the like. This may be implemented as a simple threshold applied to a particular estimated property, or as a more complex algorithm.

By performing step 201 prior to step 205 it may be possible that steps 203, 205 and 207 may be performed in real-time or near-real-time. Though, in some embodiments, step 201 may be performed after step 203 such as may be the case when database generation was not possible prior to the acquisition of measurement data, and perhaps further exacerbated by the fact that the test object may be no longer available for measurement.

In some embodiments method 200 include step 209, wherein the property of the test object is used to control a process. For example, the property measurement may be fed back into a control circuit that controls a process. In one embodiment the property is used to control an AM process.

Having described method 200 it should be appreciated that in some embodiments the order of the steps of method 200 may be varied, not all steps illustrated in FIG. 2 are performed, additional steps are performed, or method 200 is performed as some combination of the above. While method 200 was described in connection with system 100 shown in FIG. 1, it should be appreciated that method 200 may be performed with any suitable system.

Having described embodiments of a system and method some embodiments are described where they are used for AM processes.

The inventors have recognized and appreciated that only if AM metal parts can be produced with verifiable properties that meet or exceed requirements, will AM parts substantially impact the cost and performance of U.S. military aircraft flight critical components. In addition to fabrication of initial production parts, capability to produce high quality replacement parts can reduce sustainment costs and substantially improve aircraft availability. According to Sharon Ford of the United States International Trade Commission "limits on the size of goods produced by additive manufacturing have likely constrained adoption of this technology in the aerospace industry. Issues with materials, accuracy, surface finish, and certification standards have further limited its use" [1]. Also, according to John Slotwinski at the NIST Intelligent Systems Division, "Improved measurements and standards will help overcome existing AM limitations and barriers" [2]. The concept of adding sensing to improve real-time AM processes is not new. For example, NIST is pursuing real-time measurements of additive processes, with methods such as high-speed thermal, high-speed vision, and an in-situ porosity sensor.

The inventors have recognized and appreciated the need for a real-time sensing developer kit including both JENTEK's MWM-Array, eddy current testing (ET) technology and optical methods to provide a means for qualifying metrological and metallurgical properties (including detection of local defects) of flight critical and multi-material AM parts. The goal is to enable machines from different vendors to use such developer kits to meet standards set for AM parts to ensure performance and safety across the supply chain first for the US military and later for commercial fleets. The MWM-Array methods are already a US military and FAA approved method for some commercial engines, and MWM-Array methods are consistent with ASTM Standards E-2338-11 [3] and E2884-13 [4].

Both defect imaging and 3-D digital material property feedback and recording are addressed by this innovation. Relevant powder based processes include Direct Metal Laser Sintering. The innovation addresses AM processes such as those requiring multiple materials or high temperature arrays.

In some embodiments the sensing package is modular and incorporated into many AM machines for multiple vendors and for different AM processes. A key in some embodiments is to have standards that are general enough to ensure that integrated sensing for quality control of metal AM parts do not require a single proprietary method.

In some embodiments the technology is used for critical metal components that need the highest level of integrity to be viable replacements for conventional machined parts in critical aerospace and power system components.

Real-time metrology for AM parts may enable improved quality; but, alone metrology cannot provide assessment of quality sufficient for fatigue critical engine and structural components. Both defect detection and metallurgical property measurements are also needed. Recent improvements in price and performance of computed tomography (CT) methods has improved NDT and quality assessment for AM parts, as indicated in several presentations at the recent A4A and AA&S conferences in the summer of 2016. However, traditional NDT methods for defect detection such as ultrasonic testing (UT), digital radiography (RT), and eddy current testing (ET) can detect only relatively large buried defects, bulk porosity variations, and small surface defects; but, cannot provide the needed quality control for most AM parts throughout the entire part thickness. Of particular interest is not only detection of bulk average porosity or large defects, but also tracking of small defects that might become stress concentrations, local porosity clusters, and metallurgical property variations.

In some embodiments this innovation provides real-time, in-process 3-D digital imaging of each applied layer of new material, using a combination of optical and magneto-quasistatic (MQS) sensing methods, such as the JENTEK MWM-Array. MQS methods use magnetic fields ranging from 2.5 Hz to 20 MHz to measure electrical conductivity and magnetic permeability of layered media.

There are several key innovations that have enabled the real-time measurement and feedback of metrology and metallurgical data during AM processing, with the goal of delivering higher performance, lower cost parts for enhanced military platform capabilities. The concept is to place the JENTEK MWM-Array (linear drive eddy current array) either in the rake/roller or following the rake/roller so that it has no impact on the process efficiency and can be used to provide real-time feedback and an archived digital map of the entire part volume. The specific innovations include (1) high temperature MWM-Array non-contact sensing of electrical conductivity; (1.a) metallurgical property verification (e.g. heat treatment, hardness through conductivity); (1.b) porosity imaging; (1.c) local defect detection and sizing to assess importance; (1.d) local material temperature monitoring (i.e. through correlation of conductivity and temperature); (1.e) grain anisotropy imaging using one or two different linear drive MWM-Array configuration, or possibly including a bi-directional or quadri-directional MWM configuration, as well; (2) room temperature and high temperature MWM-Array imaging of geometry/surface topology; (3) room temperature and high temperature MWM-Array imaging of powder—this includes the potential to estimate particle size distributions near the surface of the powder and at varied depths, as well as particle properties; (4) high temperature non-invasive monitoring of the laser/material interface; (5) dual mode sensing using MQS and optical methods to enhance results; (6) post processing heat treatment process and other post AM process monitoring and assessment; and (7) real-time nonlinear process control using HyperLattice based MIMs.

In some embodiments, 4, "high temperature non-invasive monitoring of the laser/material interface", requires the sensor to project fields into the interface area. A segmented field sensor may be used to enable measurements in this area.

"Real-time nonlinear process control", 7 above, is a method that uses precomputed databases of process conditions, generated off-line in advance using a process model, and provided real-time sensor feedback based process control for non-linear systems.

The MWM-Array has many unique advantages for this specific AM application; however, it is also possible to use other eddy current array configurations. The MWM-Array uses magnetic fields and magnetoquasitstatic (MQS) methods for conducting or magnetic media such as metals or magnetic particle suspensions (such as for low observable, LO, coatings); thus non-conducting AM parts such as for stealth applications could also be addressed. Sprayed LO coatings are an ideal application for the proposed methods.

JENTEK has also developed a unique concept for segmented field dielectric sensing arrays called Interdigitated Electrode Dielectrometer arrays (IDED-Arrays). These IDED-Arrays can image properties of non-conducting parts such as ceramic matrix composites, plastics, and polymers, as well as adhesives and other such materials. In some embodiments, the innovation is used to provide real-time feedback of IDED-Array data for non-conducting or relatively low conductivity parts.

Figure 3:
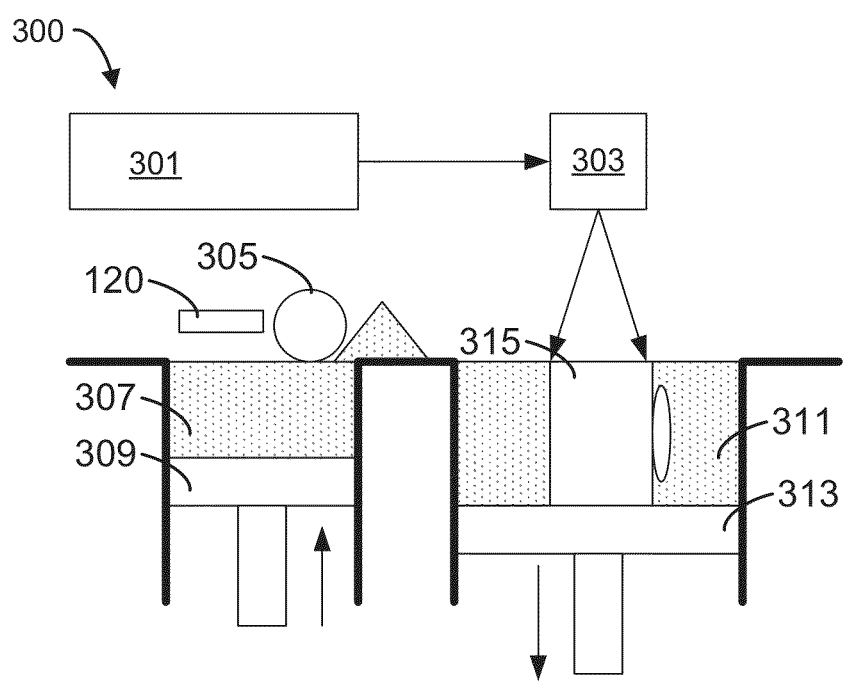
FIG. 3 is a schematic of a selective laser sintering (SLS) processing system with an real-time non-destructive evaluation component according to some embodiments.

FIG. 3 shows a schematic of a selective laser sintering (SLS) processing system 300 [5]. SLS processing system 300 includes powder delivery piston 309 that controls the volume of a powder reserve bed 307. A roller or rake 305 distributes the powder over the powder bed 311, the depth of which is controlled by fabrication piston 313. The AM component 315 is built within powder bed 311 by using laser 301 and scanner system 303 to selectively sinter powder in the powder reserve bed. AM component 315 is formed in successive layers, each layer formed by roller/rake 305 introducing a new layer of material to powder bed 311, and laser 301/scanner system 303 selectively sintering the new powder layer.

SLS processing system includes sensor 120 which provides a metallurgical imaging of each individual layer of AM material immediately following application to the part. In some embodiments system 300 includes and forms part of system 100 and thus includes any or all of the additional components described with reference to FIG. 1.

The movement of this roller or rake (typically 0.5-1 in. per second) is ideal for intimate scanning using MQS sensing array methods, such as the MWM-Array, In addition, the MWM-Array can image not only the top layer most recently applied, but also the change in properties at the interface between the top layer and the prior layer. Furthermore, the MWM-Array can characterizing the powder properties, the powder and part temperature, and the part geometry.

In one approach sensor 120 follows roller/rake 305 in a non-contact mode to measure the electrical conductivity of the layer at multiple frequencies. In one embodiment sensor 120 is an MWM-Array providing a measure of the average porosity, detection of local defects, and absolute electrical conductivity (given an independent measure of temperature) with a high resolution image, as well as a measure of the variation in these properties with depth within the latest layer, and a measure of the metallurgical bond quality between layers (using a model based multivariate inverse method, MIM, that includes a representation of the metallurgical bond layer as an additional thin layer within the model, represented by a conductivity-thickness product with an assumed bond layer thickness). As each new layer is applied, sensor 120 can also provide a measure of the prior layer properties, through the last applied layer, to verify that the properties remain within the control objectives.

Figure 4:
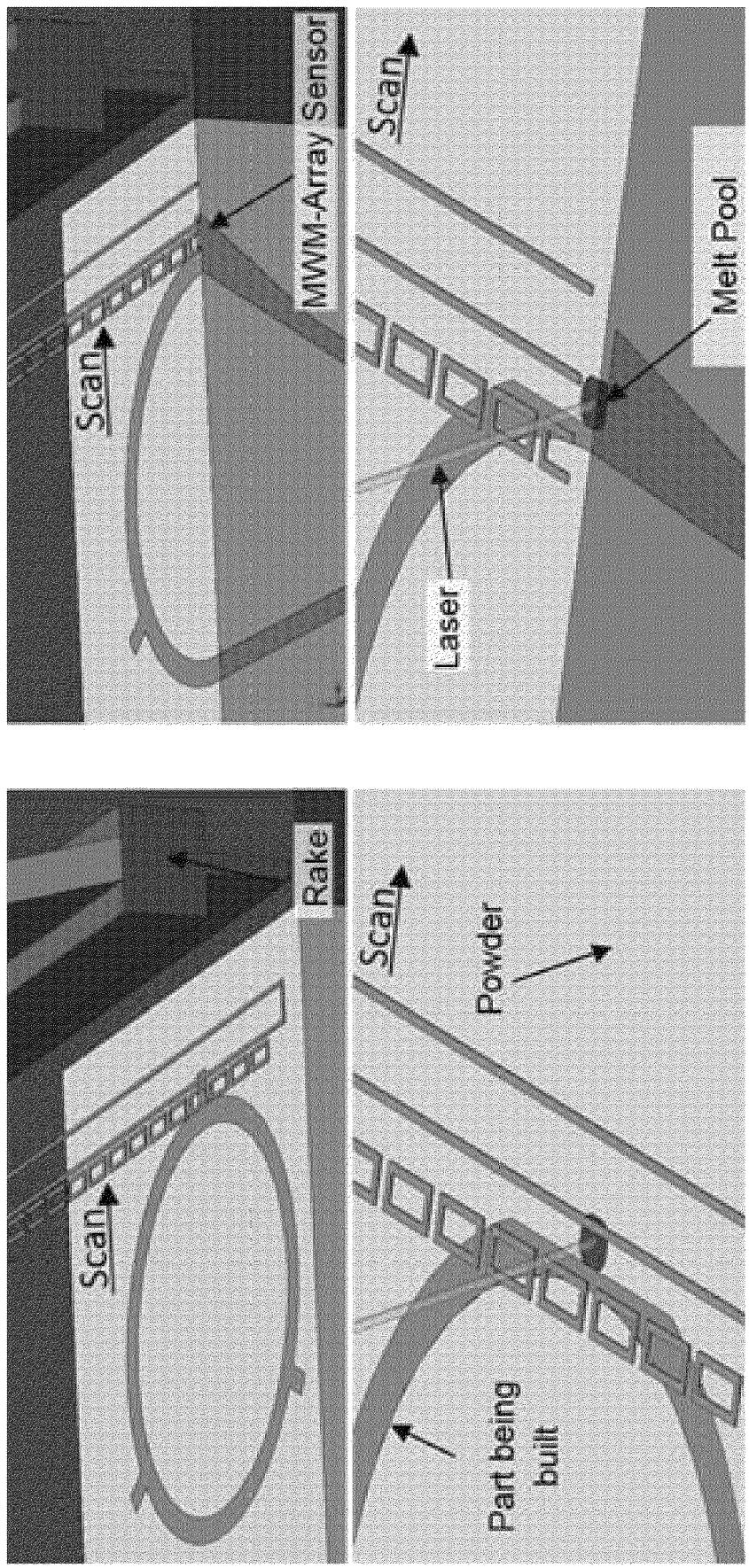
FIG. 4 is a detail of a powder bed and AM part during fabrication while non-destructive evaluation is being performed using a linear drive eddy current sensor, according to some embodiments.

The promise of fatigue and fracture critical metal AM components will be realized with an in-process layer-by-layer NDE and post-process NDE that can be adapted for the defect types of interest. FIG. 4 provides illustrations of two concepts for integration of a linear array eddy current sensing technology into a Powder Bed Fusion (PBF) machine. These two configurations are a means for providing real-time feedback to improve part quality through process control. Layer-by-layer NDE and post-process NDE can be performed.

FIG. 4 shows: (top-left) Concept with the MWM-Array integrated into the rake for scanning of both the powder and the metal after deposition of each new layer. (top-right) Same concept showing a cross-section view. (bottom-left) Concept for melt pool monitoring where the laser (yellow) passes through the sensor (between the linear drive conductor and the linear row of sensing elements) so that the sensor can monitor the properties of the melt pool. (bottom-right) Same concept showing a cross-section view.

One of the biggest roadblocks to the qualification of AM parts for fatigue and fracture critical parts is the presence of internal defects (voids, incomplete fusion, underfill, inclusions, etc.) and the current inability to reliably detect these defects during manufacturing QA. In-situ NDE and post-process inspection of AM parts is needed.

Linear drive eddy current technology and model-based MIMs are ideal for high accuracy absolute property measurement in layered media, and for detecting variations in and local occurrence of increased porosity, incomplete fusion, and geometric anomalies such as balling, warping, swelling and even for characterizing surface roughness.

Systems that include impedance instruments such as the 7-channel handheld jET (FPGA-based) from JENTEK Sensors, or the higher channel count 8200 series product for high throughput imaging, also from JENTEK, can be practically integrated into a powder bed AM process to provide the needed layer-by-layer materials characterization and NDE.

As shown in FIG. 4 the MWM-Array has a linear drive that provides full spatial coverage with no gaps and a linear array of sensing elements. Furthermore, the MWM-Array technology uses an innovative model-based MIM to not only rescale layer property (conductivity and magnetic permeability) measurements for varied lift-off (proximity) but also to provide accurate lift-off and surface topology measurement. The MWM-Array can measure dispersive, frequency dependent properties of powders, finding clumps and other anomalies at very high frequencies, offering additional potential for eliminating defects. Scan rates for modern impedance instruments and eddy current sensors can now exceed 3 inches per second when needed, while acquiring data from numerous channels in a fully parallel configuration (i.e., the full width of the powder bed). Thus, inclusion such NDE technology will not significantly slow down the fabrication rates for metal AM parts.

Having thus described several aspects of at least one embodiment of this invention, it is to be appreciated that various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers.

It should be appreciated that while specific item (e.g., an MWM sensor) within a class (e.g., linear drive eddy current sensors, eddy current sensors, sensors) have been referred to in this specification so as to provide concrete examples of embodiments of the invention, other embodiments include the class itself (e.g., "eddy current sensor") or other members of the class (e.g., pencil probe, as pencil probe is another member of the class "eddy current sensor").

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, the invention may be embodied as a computer readable medium (or multiple computer readable media) (e.g., a computer memory, one or more floppy discs, compact discs, optical discs, magnetic tapes, flash memories, circuit configurations in Field Programmable Gate Arrays or other semiconductor devices, or other tangible computer storage medium) encoded with one or more programs that, when executed on one or more computers or other processors, perform methods that implement the various embodiments of the invention discussed above. The computer readable medium or media can be transportable, such that the program or programs stored thereon can be loaded onto one or more different computers or other processors to implement various aspects of the present invention as discussed above.

In this respect, it should be appreciated that one implementation of the above-described embodiments comprises at least one computer-readable medium encoded with a computer program (e.g., a plurality of instructions), which, when executed on a processor, performs some or all of the above-discussed functions of these embodiments. As used herein, the term "computer-readable medium" encompasses only a computer-readable medium that can be considered to be a machine or a manufacture (i.e., article of manufacture). A computer-readable medium may be, for example, a tangible medium on which computer-readable information may be encoded or stored, a storage medium on which computer-readable information may be encoded or stored, and/or a non-transitory medium on which computer-readable information may be encoded or stored. Other non-exhaustive examples of computer-readable media include a computer memory (e.g., a ROM, a RAM, a flash memory, or other type of computer memory), a magnetic disc or tape, an optical disc, and/or other types of computer-readable media that can be considered to be a machine or a manufacture.

The terms "program" or "software" are used herein in a generic sense to refer to any type of computer code or set of computer-executable instructions that can be employed to program a computer or other processor to implement various aspects of the present invention as discussed above. Additionally, it should be appreciated that according to one aspect of this embodiment, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

[1] Ford, S, "Additive Manufacturing Technology: Potential Implications for U.S. Manufacturing Competitiveness," Journal of International Commerce and Economics, web version, September 2014.

[2] Slotwinski, J., "Additive Manufacturing at NIST," Presentation at The Science of Digital Manufacturing Conference, MIT, Mar. 7, 2013.

[3] ASTM E2338-11 Standard Practice for Characterization of Coatings using Conformable Eddy-Current Sensors without Coating Reference Standards, ASTM International, Book of Standards, Vol. 03.03.

[4] ASTM E2884-13 Standard Guide for Eddy Current Testing of Electrically Conducting Materials Using Conformable Sensor Arrays, ASTM International, Book of Standards Vol. 03.03.

[5] Schematic of Selected Laser Sintering process: http://en.topmaxtech.net/reviews/2015/12/27/types-of-3d-printers-or-3d-printing-technologies-overview/279.html

What is claimed is:

1. A method for measuring a property of an additive manufacturing (AM) layer most recently deposited, the method comprising acts of:
  moving an eddy current sensor across the AM layer;
  measuring with the eddy current sensor the property of a material of the AM layer, wherein measurement of the property is compensated for lift-off of the eddy current sensor from the AM layer; and
  determining a condition of the AM layer from the property.

2. The method of claim 1, wherein the eddy current sensor has a linear drive and a plurality of sensing elements, each sensing element among the plurality at a fixed distance from the linear drive.

3. The method of claim 1, wherein a model is used to generate a set of precomputed responses before the act of moving and an algorithm is used to determine the lift-off and the property of the material of the AM layer from a response of the eddy current sensor.

4. The method of claim 1, wherein the property is a first property and the method further comprises:
measuring a second property of a bonded interface; and
determining whether the bonded interface is of acceptable quality from the second property.

5. The method of claim 1, wherein
in the act of moving, the eddy current sensor contacts the AM layer, and
in the act of determining, a surface roughness of the material of the AM layer is measured using the lift-off.

6. The method of claim 1, further comprising:
controlling AM processing of subsequent layers based on the condition of the AM layer.

7. The method of claim 1, wherein the property is an electrical conductivity of the material of the AM layer.

8. The method of claim 1, wherein the material is a sintered portion of the AM layer, and the method further comprises measuring with the eddy current sensor a property of a powder portion of the AM layer.

9. The method of claim 1, wherein the sensor follows a spreading apparatus used to spread powder across the fabrication area.

10. The method of claim 1, wherein the eddy current sensor comprises drive and sense windings made of a nickel alloy on an insulating substrate.

11. The method of claim 10, wherein
the insulating substrate is ceramic, and
electrical leads to the windings have a portion proximal to the windings that are also made of the nickel alloy and a distal portion made of an alloy having a lower melting temperature than the nickel alloy.

* * * * *